US006313873B1

(12) United States Patent
Lee

(10) Patent No.: US 6,313,873 B1
(45) Date of Patent: Nov. 6, 2001

(54) TROUBLE-DIAGNOSING SYSTEM AND METHOD FOR TELEVISION RECEIVER

(75) Inventor: Jae Kyung Lee, Taegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/757,127

(22) Filed: Dec. 3, 1996

(30) Foreign Application Priority Data

Dec. 5, 1995 (KR) .............................................. P95-46680

(51) Int. Cl.⁷ .................................................. H04N 17/00
(52) U.S. Cl. ............................................ 348/177; 348/569
(58) Field of Search ................................... 348/177, 178, 348/725, 553, 563, 569; H04N 5/44, 17/00, 17/04

(56) References Cited

U.S. PATENT DOCUMENTS 5,510,849 * 4/1996 Han ........................................ 348/177

FOREIGN PATENT DOCUMENTS

| 4041446 | * | 7/1991 | (DE) | ............................. | H04N/17/00 |
| 0407791 | * | 1/1991 | (EP) | ............................. | H04N/5/44 |
| 0551178 | * | 7/1993 | (EP) | ............................. | H04N/17/04 |
| 5-115079 | * | 5/1993 | (JP) | ............................. | H04N/17/04 |
| 8065587 | * | 3/1996 | (JP) | ............................. | H04N/5/44 |

* cited by examiner

Primary Examiner—David E. Harvey

(57) ABSTRACT

A self-diagnosing system for a television receiver (TV) which enables a user to personally solve simple problems caused by his inexperience in using a TV without need of the product manual or the repair service of an A/S center. The system includes a key matrix including a key for determining a self-diagnosing mode and keys for selecting self-diagnosing menus on the problems, a control section for identifying a corresponding example of the problem when the keys on the key matrix are selected, and providing instructions as to how to solve the problem through a video and/or audio signal, a storage section for storing at least one instructions to solve the problems and providing the instructions to the control means under the control of the control section, and an output section for outputting the video and/or audio signal provided from the control section to a cathode ray tube.

15 Claims, 2 Drawing Sheets

FIG.1 (PRIOR ART)

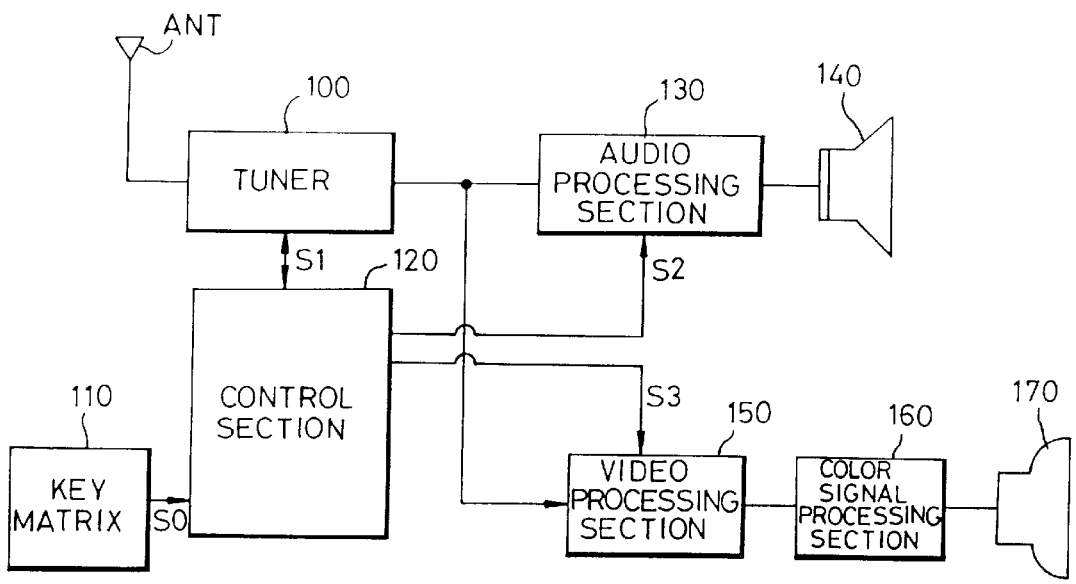

FIG. 2

| AUDIO | 11. IMAGE COMES ONTO THE SCREEN BUT NO SOUND IS HEARD.<br>12. SOUND IS HEARD WHEN TV IS TURNED ON BUT IS TOO LOUD OR TOO QUIET. |
|---|---|
| VIDEO | 21. COLORS DO NOT APPEAR.<br>22. CHROMATICITY IS NOT GOOD. |
| TIME | 31. RESERVATION FUNCTION DOES NOT WORK.<br>32. TIME INDICATED ON TV IS NOT CORRECT. |
| CHANNEL | 41. BROADCAST IS NOT RECEIVED.<br>42. UNNECESSARY CHANNELS ARE STORED. |
| ANTENNA | 51. THE SCREEN IS SPOTTED OR FLICKERING.<br>52. PICTURES OVERLAP. |

TROUBLE-DIAGNOSING SYSTEM AND METHOD FOR TELEVISION RECEIVER

BACKGROUND OF THE INVENTION

1. Field of the Invention

The present invention relates to a self-diagnosing system and method for a television receiver (TV), in particular, a system and a method for self-diagnosing a TV which enables a user to personally solve problems frequently caused by a user's inexperience with a TV or the malfunction of the TV itself.

2. Description of the Prior Art

In general, TVs and other household electric appliances include product manuals which explain how to use the products and how to solve simple problems with the products.

If a problem is caused in a product, the user can take necessary measures by referring to the manual and comparing the current problem with the problems described in the manual. By reference to the manual, the user can simply solve the problems caused by his inexperience with the product or malfunctioning of the product itself.

However, manuals can be easily lost and are somewhat difficult for older people or children to understand. Users generally request the repair services of an after-service center if they encounter trouble with their TV, rather than taking necessary measures as indicated by the product manual.

Thus, even cases where the trouble is simple such that the user can easily solve it by reference to the manual, the user will not be able to watch the TV until it is repaired. Also, the company manufacturing the product will be excessively burdened due to frequent service calls.

SUMMARY OF THE INVENTION

The object of the present invention is to provide a self-diagnosing system and method for a TV which is convenient to use when solving trouble with a TV. According to the trouble-diagnosing system and method of the present invention, if a user selects the trouble-diagnosing mode key, the control section, in response to the user selection, displays a plurality of trouble-diagnosing menus and examples of the problems. The user who has read the trouble-diagnosing menu and examples of the problems, selects the example corresponding to the current problem. Then the control section will determine whether a solution exists for the selected problem, and if so, perform the solution to automatically fix the problem. For example, if a user selects a problem associated with lack of color in the display, the control section will automatically initialize the color balance data to default values to restore color.

For example, the control section will display a time setting program by an on-screen display (OSD) on the CRT so that the user can adjust the stored time. If the problem is not caused by the user's mistake, the control section will recognize that the video trouble resulted from another part's malfunction and will give a video and/or audio message that the user must request the repair services of an after-service center.

In one aspect of the present invention, the self-diagnosing system for a television receiver (TV) comprises:

a key matrix including a key for determining a self-diagnosing mode and keys for selecting self-diagnosing menus on the problems;

control means for identifying a corresponding example of the problem when the keys on the key matrix are selected, and providing instructions as to how to solve the problem through a video and/or audio signal;

storage means for storing at least one instructions to solve the problems and providing the instructions to the control means under the control of the control means; and output means for outputting the video and/or audio signal provided from the control means to a cathode ray tube (CRT).

In another aspect of the present invention, the self-diagnosing method for a television receiver comprises the steps of:

a) selecting a self-diagnosing mode key;

b) displaying a plurality of self-diagnosing menus and examples of problems corresponding to the respective menus on a display screen;

c) selecting one of the examples corresponding to a current problem from the displayed examples using numeric keys provided on a remote controller;

d) initializing the stored data corresponding to the selected example of the problem, or displaying on the display screen or outputting through an audio signal the instructions as to how to solve the current problem, after identifying the type of the problem selected at step c).

BRIEF DESCRIPTION OF THE DRAWINGS

The above object, other features, and advantages of the present invention will be more clearly understood by describing the preferred embodiment thereof in accordance with the accompanying drawings, in which:

FIG. 1 is a block diagram of a self-diagnosing system for a TV according to the present invention.

FIG. 2 is an exemplary table of a displayed menu for selecting a current problem according to the present invention.

DETAILED DESCRIPTION OF THE PREFERRED EMBODIMENT

Figure 3:
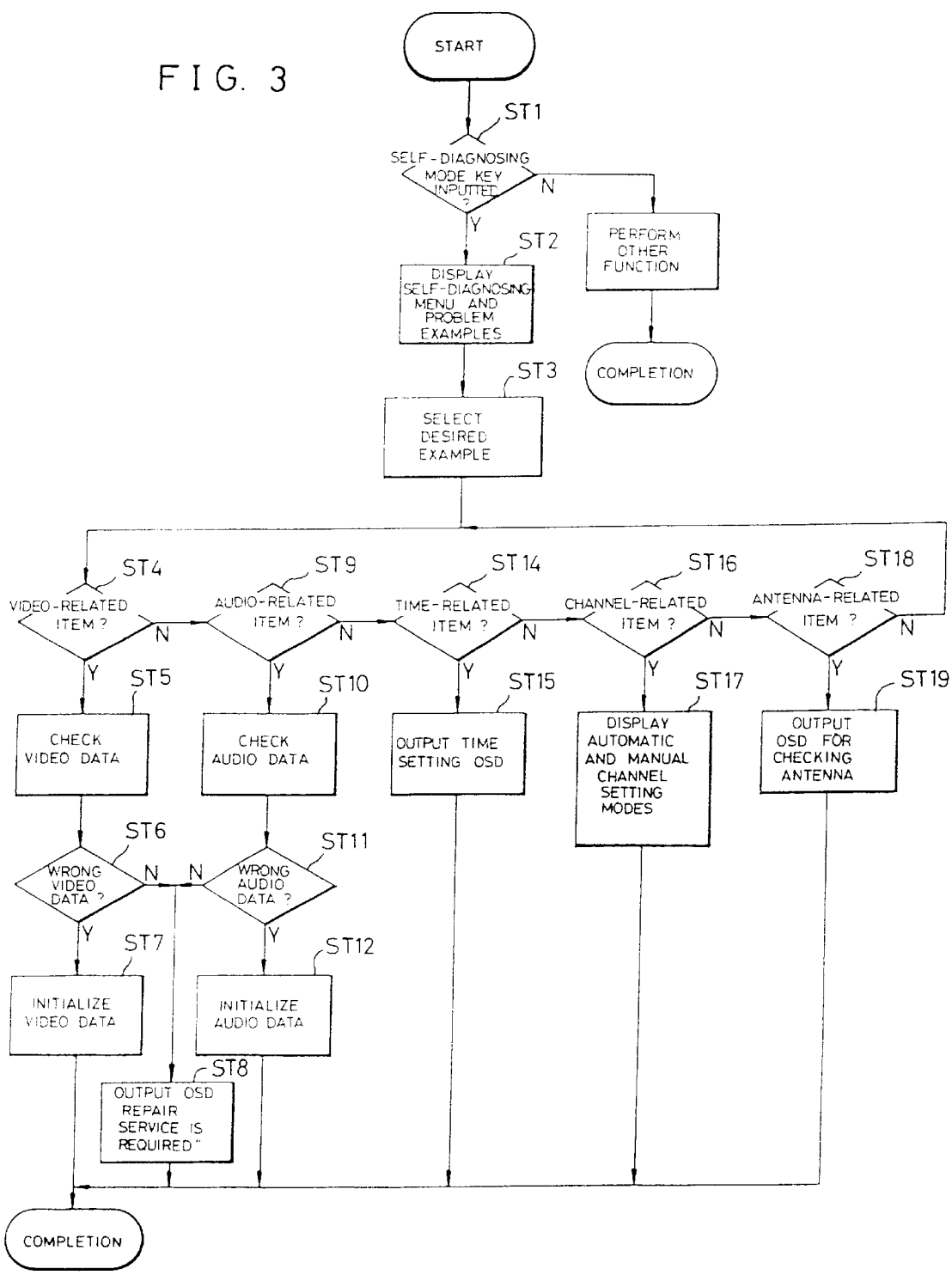
FIG. 3 is an algorithm diagram explaining the self-diagnosing method according to the present invention.

With reference to FIG. 1, the self-diagnosing system according to the present invention comprises a key matrix 110 including a self-diagnosing mode key and keys for selecting self-diagnosing menus on TV problems, a control section 120 for providing control signals after identifying the key signal So selected from the key matrix 110, a tuner 100 for tuning a frequency corresponding to the channel selected in the composite video signal which is inputted through an antenna ANT according to a first control signal Si of the control section 120, an audio processing section 130 for processing an audio signal provided from the tuner 100 according to a second control signal S2 of the control section 120 and outputting the audio signal through at least one loudspeakers 140, a video processing section 150 for processing a video signal provided from the tuner 100 according to a third control signal S3 of the control section 120, and a color signal processing section 160 for converting the video signal processed by the video processing section 150 into color signals and provide the processed color signals to a cathode ray tube (CRT) 170.

If a problem arises in a TV and the user presses the self-diagnosing mode key in the key matrix 110, the control section 120 will display a plurality of self-diagnosing menus and a plurality of examples of problems on the CRT 170 by controlling the video processing section 150. Subsequently, the user can select the example of the problem corresponding to the current problem in the TV by means of the remote controller. After identifying the selected example of the problem, the control section will initialize the data stored in the control section 120, or output a video and/or audio signal for the instructions as to how to solve the current problem through the CRT 170 and/or the loudspeakers 140.

The operation of the self-diagnosing system of the present invention will be described below with reference to FIGS. 2 and 3.

If a user notices a problem while watching TV, he selects the self-diagnosing mode key provided on the key matrix 110 before requesting repair service of an A/S center. Then, the control section 120 identifies the input of the self-diagnosing mode key (step ST1 in FIG. 3), displays a plurality of self-diagnosing menus and examples of problems corresponding to the menus, and waits for the next step (step ST2). The user, having read the self-diagnosing menu and examples of problems, selects the example corresponding to the current problem (step ST3).

Practically, the self-diagnosing menu may consist of five items including video, audio, time, channel and antenna. However, additional items can be added to the menu for the user's convenience.

As shown in FIG. 2, each item of the self-diagnosing menu is displayed together with the examples of corresponding problems. More examples of problems which are frequently caused can be freely added.

If the user selects one of the displayed examples, the control section 120 will identify the type of the selected problems (steps ST4, 9, 14, 16, and 18) to initialize the relevant data or instruct what steps are necessary to solve the problem by means of the video and/or audio signal through the CRT 170 and/or loudspeakers 140.

In other words, if the example of the problem selected by the user relates to the video and audio items (steps ST4 and ST9), the control section 120 will check the present condition of the stored video and/or audio-related data (steps ST5 and ST10) to identify whether there is something wrong (steps ST6 and ST11). If the trouble resulted from a video and/or audio function problem, the control section 120 will initialize the stored data (steps ST7 and ST12)

If there is no relevant video and audio data, however, the control section 120 will give a video and/or audio message through the CRT 170 and/or loudspeakers 140 (step ST8) that the user must request the repair services of an after-service center.

If the example of the problem selected by the user relates to time, the control section 120 will display a time setting program on the CRT 170 so that the user can re-adjust the stored time.

If the example of the problem selected by the user relates to the channel, the control section 120 will display the manual and automatic channel setting modes on the CRT 170 so that the user can set channels manually or automatically using the key matrix 110.

If the example of the problem selected by the user relates to the antenna, the control section 120 will give a video and/or audio message through the CRT 170 and loudspeakers 140 instructing to check the antenna.

Specifically, if the user selects the item "Image comes onto the screen, but no sound is heard" relating to audio problems using the key matrix 110 and selects a running key provided on the key matrix 110, the control section 120 will recognize that there is an audio-related problem (step ST9) and check whether the trouble has been caused by the user's mis-operation of the audio related PWM data (high or low level sound) (step ST10).

If the control section 120 identifies that the problem was caused by the user's mistake after checking the audio-related data, for example, in case no sound is heard because the user has set an audio volume to "0", it will initialize the current audio data to the stored standard level (steps ST11 and ST12).

However, if the audio data is normal, the control section 120 will recognize that the audio trouble resulted from an other part's malfunction and will give a video and/or audio message that the user must request the repair services of an after-service center (step ST8).

If the user selects the item "Colors do not appear on the screen" relating to video problems using the key matrix 110 and the running key provided thereon, the control section 120 will recognize that there is a video-related problem (step ST4) and check whether the problem has been caused by the user's misoperation of the video-related PWM data (brightness, color, etc.) (step ST5).

If the control section 120 identifies a problem after checking the video-related data, for example, in case the brightness or color is improper or imbalanced by the user's mis-operation, it will initialize the current video data to the stored standard level (steps ST6 and ST7).

However, if the video data is normal, the control section 120 will recognize that the video trouble resulted from an other part's malfunction and will give a video and/or audio message that the user must request the repair services of an after-service center (step ST8).

If the user selects the item "Reservation function does not work" using the key matrix 110 and the running key provided thereon, the control section 120 will recognize that there is a time-related problem (step ST4) and display a time setting mode on the CRT 170 to enable the user to set a correct time.

If the user selects "desired broadcast is not received" and presses the running key provided on the key matrix 110, the control section 120 will recognize that there is a channel-related problem (step ST16) and will execute the automatic channel setting (step ST17).

However, in case the item "Unnecessary channel is set" is selected and the relevant running key is pressed, the control section 120 will perform the manual channel setting so that the user can manually set only the channels that he wants.

If the user selects the item "The screen is spotted or flickering" or "Pictures overlap" and presses the running key provided on the key matrix 110, the control section 120 will recognize that there is an antenna-related problem (step ST18) and give a video and/or audio message through the CRT 170 and the loudspeakers that the user must check the antenna 140.

According to the present invention, when a problem is caused in a TV, the self-diagnosing system initializes the data relevant to the item of the problem to the standard level, or gives a video and/or audio message through the CRT and loudspeakers to enable the user to personally adjust the relevant item. It is an advantage of the present invention that user can easily solve simple problems in a TV without referring to the manual.

While the present invention has been described and illustrated herein with reference to the preferred embodi-

What is claimed is:

1. A trouble-diagnosing method, for a television receiver, comprising:

receiving a user input for trouble diagnosis;

in response to the user input, displaying on a display a plurality of predetermined troubles able to occur during operation of the receiver;

receiving from the user a selection of one of the displayed troubles; and displaying on a display screen or outputting through an audio signal instructions as to how to solve the trouble selected by the user, after identifying a type of the selected trouble, wherein the displaying on a display screen or outputting through an audio signal instructions informs the user that the display device itself cannot automatically perform display adjustments or provides the user with options allowing the user to directly perform display adjustments.

2. The trouble-diagnosing method of claim 1, wherein the plurality of problems include commonly encountered problems in video, audio, time, channel, or antenna portion in a television receiver.

3. The trouble-diagnosing method of claim 1, wherein when the user-selected problem relates to the video or audio signal, the solution performing step includes setting the data associated with the video or audio to predetermined values to automatically fix the user-selected problem.

4. The trouble-diagnosing method of claim 1, wherein, when the user selects a problem associated with time, the method further comprises displaying on the display a time setting program so that the user can adjust the time.

5. The trouble-diagnosing method of claim 1, wherein, when the user selects a problem associated with a channel, the method further comprises displaying on the display a manual channel setting or automatic channel setting menu so that the user can manually set the channels or allow the display device to set the channels automatically.

6. A trouble diagnosing system for a television receiver comprising:

storage circuitry storing a plurality of predetermined troubles able to occur during operation of the receiver and at least one solution to one of the predetermined troubles;

an input device including a key for selecting a trouble-diagnosing mode;

output circuitry for displaying on a display of the receiver the plurality of troubles stored in the storage circuitry; and a controller coupled to the storage circuitry, the input device and the output circuitry, and operable to control the output circuitry to display the plurality of troubles on the display in response to a user selection of the trouble-diagnosing mode key, the controller further operable to receive a user selection of one of the displayed troubles through the input device and to perform the solution, wherein the controller checks a present condition of trouble-related control data, and controller gives a video and/or audio message that the user must request a repair service if no trouble exists as a result of checking, or the controller gives a video and/or audio message that the user must check an antenna if the trouble-related control data relates to an antenna-related item as a result of checking.

7. The trouble-diagnosing system of claim 6, wherein the controller checks a present condition of trouble-related control data and performs the solution by setting the data to predetermined values to automatically fix a user-selected trouble-related item.

8. The trouble-diagnosing system of claim 7, wherein the user-selected trouble related control data is video or audio data.

9. The trouble-diagnosing system of claim 6, wherein the controller controls the output circuitry to display a trouble-related control program on the display to enable the user to solve the trouble.

10. The trouble-diagnosing system of claim 9, wherein the trouble-related control program is a channel setting program.

11. The trouble-diagnosing system of claim 9, wherein the trouble-related control program is a channel setting program.

12. The trouble-diagnosing system of claim 11, wherein the channel setting program is an automatic and manual channel setting program.

13. A trouble diagnosing system for a television receiver comprising:

a user input receiver receiving a first input from a user responding to a display abnormality; and a controller providing to the user a plurality of problems that may cause the display abnormality in response to the first input, wherein the user input receiver further receiving a second input from the user selecting one of the problems, and the controller verifying whether the selected problem exists, and attending to the selected problem upon verification or informing the user that the controller itself cannot automatically perform display adjustments or providing the user with options allowing the user to directly perform display adjustments.

14. A method, of troubleshooting for a display device, comprising:

receiving a first input from a user responding to a display abnormality;

providing to the user a plurality of problems that may cause the display abnormality;

receiving a second input from the user selecting one of the problems;

verifying whether the selected problem exists; and attending to the selected problem upon verification or informing the user that the display device itself cannot automatically perform display adjustments or providing the user with options allowing the user to directly perform display adjustments.

15. The method of claim 14, wherein attending to the selected problem involves the display device automatically performing display adjustments.

* * * * *